United States Patent [19]

Foster

[11] Patent Number: 4,657,048

[45] Date of Patent: Apr. 14, 1987

[54] VALVE ASSEMBLY FOR GLASSWARE FORMING MACHINE

[75] Inventor: Thomas V. Foster, Cantley, England

[73] Assignee: Emhart Industries Inc., Farmington, Conn.

[21] Appl. No.: 724,867

[22] Filed: Apr. 19, 1985

Related U.S. Application Data

[63] Continuation of Ser. No. 433,129, Sep. 30, 1982, abandoned.

[30] Foreign Application Priority Data

Feb. 27, 1981 [GB] United Kingdom ............... 8106181

[51] Int. Cl.⁴ .................. F16K 11/22; C03B 9/20
[52] U.S. Cl. .................. 137/884; 137/885; 137/596.15; 137/596.18; 65/263
[58] Field of Search .............. 137/596.15, 596.16, 137/596.18, 884, 885; 65/234, 263

[56] References Cited

U.S. PATENT DOCUMENTS

| | | | |
|---|---|---|---|
| 2,826,867 | 3/1958 | Nava, Jr. et al. | 49/18 |
| 3,003,478 | 10/1961 | Benaway | 137/596.15 |
| 3,171,732 | 3/1965 | Andersen | 65/229 |
| 3,385,319 | 5/1968 | Myers | 137/596.18 |
| 4,191,548 | 3/1980 | Fortner et al. | 65/79 |

FOREIGN PATENT DOCUMENTS 2321095 11/1974 Fed. Rep. of Germany ............ 137/596.15
2426025 10/1978 France .

Primary Examiner—A. Michael Chambers
Assistant Examiner—John C. Fox
Attorney, Agent, or Firm—H. Samuel Kieser

[57] ABSTRACT

A valve assembly for controlling the application of suction and counterblow air to a blank mould of a glassware forming machine. The assembly comprises a body (1, 2, 3, 4) in which are enclosed a first valve (5) for controlling the application of suction, a second valve (6) for controlling the flow of counterblow air, and a third valve (7) for venting the blank mould. The body (1, 2, 3, 4) has a central chamber (32) through which the suction is applied when the first valve (5) is open, through which the counterblow air passes when the second valve (6) is open, and through which the mould is vented when the third valve (7) is open.

5 Claims, 3 Drawing Figures

VALVE ASSEMBLY FOR GLASSWARE FORMING MACHINE

This application is a continuation of application Ser. No. 433,129, filed 9-30-82, now abandoned.

TECHNICAL FIELD

This invention is concerned with a valve assembly for controlling the application of suction and counterblow air to a blank mould of a glassware forming machine, the valve assembly comprising a first valve for controlling the application of suction to the blank mould, a second valve for controlling the flow of counterblow air to the blank mould, and a third valve for venting the blank mould to atmosphere.

BACKGROUND ART

In the manufacture of glassware by the conventional blow and blow process using an individual section (I.S.) machine a gob of molten glass is first formed into a parison in a blank or parison-forming mould at a blank station of the machine. The parison is formed in an inverted position at the blank station and is then swung by a transfer and invert mechanism to an upright position at a blow station. The transfer and invert mechanism has neck ring mould parts which define the base of the blank mould cavity at the blank station and which support the parisons while the latter are being transferred from the blank station. The gobs of molten glass are guided through the open top of the blank mould and are drawn into the neck ring mould parts of the transfer and invert mechanism by suction applied to the base of the blank mould, either on its own or, more usually, in combination with pressure air ("settle blow") applied to the top of the blank mould. After an appropriate interval, the suction ("vacuum settle") is removed, the blank mould is vented and then air under pressure ("counterblow air") is applied to the base of the blank mould cavity to force the molten glass against the wall of the blank mould to form the parison. The counterblow air is then removed, the blank mould again vented and the blank mould parts opened to allow the parison to be swung away from the blank station by the transfer and invert mechanism.

Hitherto, the application of suction to the blank mould has been controlled by a first solenoid-operated valve, the application of counterblow air by a second solenoid-operated valve and the venting of the blank mould by a third solenoid-operated valve. Thus, three separate valves are assembled to control the application of suction and counterblow air to a blank mould.

DISCLOSURE OF INVENTION

The known arrangement of three separate valves is simplified according to the present invention in that the three valves are enclosed within a single body, the body having a central chamber through which the suction is applied to the blank mould when the first valve is open, through which the counterblow air passes when the second valve is open, and through which the blank mould is vented to atmosphere when the third valve is open.

Preferably, the first valve has a valve member which extends through the central chamber so that in use the counterblow air passes around the valve member to cool the latter after the valve member has been heated following the suction of hot air from the blank mould.

In a preferred embodiment of the invention, the first and second valves are capable of being controlled by the application of first and second pilot supplies of fluid pressure respectively, and the assembly includes a shuttle valve which responds to the first and second supplies of fluid pressure to control the third valve in such a manner that the shuttle valve directs the first supply of fluid pressure to the third valve to close the latter when the first valve is opened by the first supply of fluid pressure, and directs the second supply of fluid pressure to the third valve to close the latter when the second valve is opened by the second supply of fluid pressure.

BEST MODE OF CARRYING OUT THE INVENTION

Figure 1:
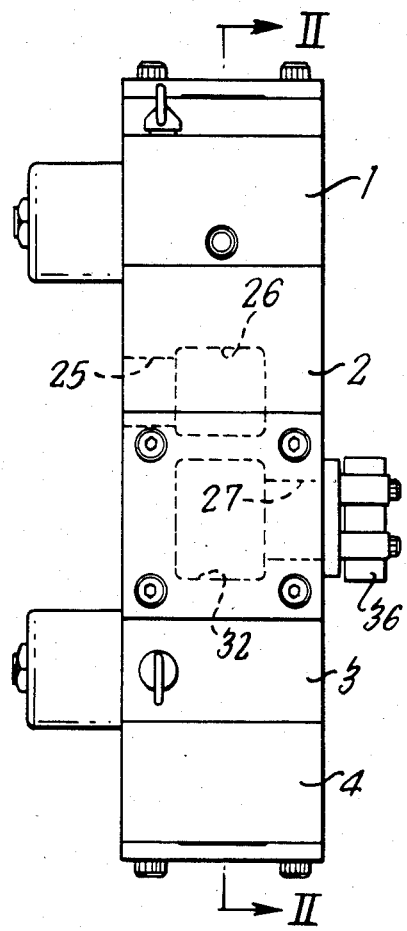
FIG. 1 is a side view of a valve assembly in accordance with the invention.
Figure 2:
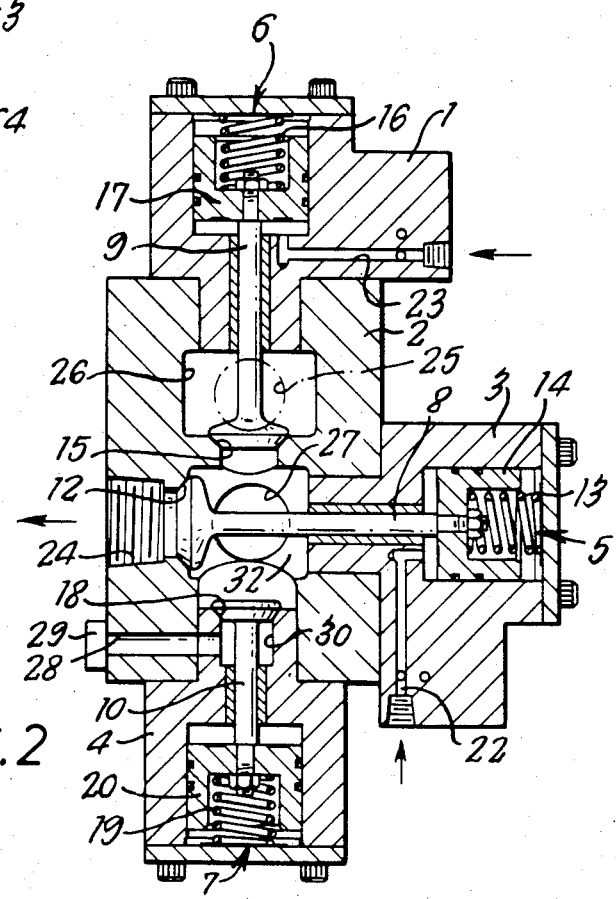
FIG. 2 is a sectional view taken on the line II—II of FIG. 1.

As shown in FIGS. 1 and 2, the valve assembly has a body formed by four blocks 1 to 4 secured together. The body encloses three valves, namely a vacuum valve 5, a counterblow valve 6, and a vent valve 7, the respective valve members of which are indicated at 8, 9 and 10.

The vacuum valve 5 is a normally closed valve in the sense that the valve member 8 is urged into engagement with a corresponding valve seating 12 by means of a compression spring 13 acting on a slidable piston 14 to which the valve member 8 is attached. Similarly, the counterblow valve 6 is a normally closed valve, the valve member 9 thereof being urged into engagement with a corresponding seating 15 by means of a compression spring 16 acting on a movable piston 17 to which the valve member 9 is attached. In contrast, the vent valve 7 is a normally open valve in the sense that the valve member 10 is urged away from its corresponding seating 18 by a compression spring 19 acting on a movable piston 20 to which the valve member 10 is attached.

The valve assembly body is formed with a first bore 22 for admitting a supply of pilot air at 45 p.s.i. (3.2 Kg/Sq. cm) to the cylinder within which the piston 14 is slidable, the application of this pilot air moving the piston 14 against the influence of the compression spring 13 to move the valve member 8 away from its valve seating 12 so as to open the vacuum valve 5. Similarly, a further bore 23 in the body is provided to lead a second supply of pilot air at 45 p.s.i. (3.2 Kg/Sq. cm) to act on the piston 17 of the counterblow valve 6 in order to move the valve member 9 away from its seating 15 so as to open the counterblow valve 6. A bore, which is not shown in FIG. 2, leads air to the cylinder in which the piston 20 is movable to displace the piston 20 against the influence of the spring 19 so as to urge the valve member 10 against its corresponding valve seating 18 in order to close the vent valve 7.

The body is formed with a passage 24 to which a vacuum or suction source is connected. A further passage 25 in the body is intended to be connected to a source of counterblow air, this passage 25 communicating with a chamber 26 ajoining the valve seating 15. In addition, the body has a further passage 27 which is intended to be connected to a conduit to the base of a blank mould at a blank station of a glassware forming machine. The passage 28, covered by a filter 29, communicates with the chamber 30 ajoining the valve seating 18.

As can be seen from FIGS. 1 and 2, the passage 27 communicates with a central chamber 32 of the body which is placed in communication with the passage 24 when the vaccum valve 7 is open, which is placed in communication with the chamber 26 and the passage 25 when the counterblow valve 6 is opened, and which is placed in communication with the chamber 30 and a passage 28 when the vent valve 7 is open.

Figure 3:
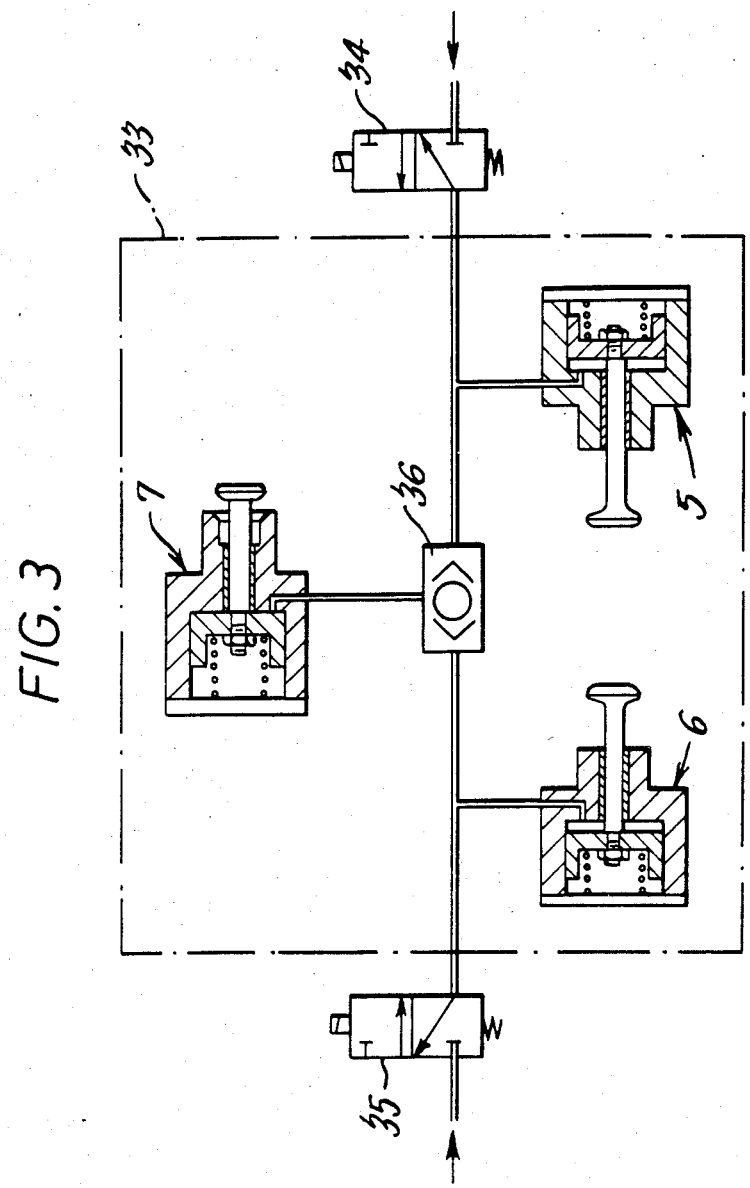
FIG. 3 is a diagrammatic view showing the individual valves of the valve assembly, together with two solenoid-operated valves.

In FIG. 3, the structure corresponding to the valve assembly shown in FIGS. 1 and 2 appears within the area bounded by the broken line 33. Within this area can be seen the vacuum valve 5, the counterblow valve 6, and the vent valve 7, these valves being shown as separate components for ease of explanation of the operation of these valves in the assembly. FIG. 3 also shows a first solenoid-operated valve 34 and a second solenoid-operated valve 35, these valves (hereinafter called "solenoid valves") in practice being mounted together with other such valves controlling the operation of the machine at a location remote from the valve assembly shown in FIGS. 1 and 2. The solenoid valve 34 controls the first supply of pilot air to the vacuum valve 5, whilst the solenoid valve 35 controls the second supply of pilot air to the counterblow valve 6. The supply of pilot air to the vent valve 7 is controlled by a shuttle valve 36 which is indicated diagrammatically in FIG. 3 and which in structural form is shown attached to the body of the valve assembly in FIG. 1.

The sequence of the operations of the valve assembly will now be described. The first stage in the operational sequence is to apply suction to the base of the blank mould in order to draw the gob of molten glass into the neck ring parts of the transfer and invert mechanism. This is achieved by energising, and therefore opening, the solenoid valve 34 which provides the first supply of pilot air to vacuum valve 5 in order to open the latter. As a result, suction is applied to the blank mould from the passage 24 through the central chamber 32 and the passage 27. During the application of suction to the blank mould, the solenoid valve 35 is not energised and is therefore closed so that the counterblow valve 6 is closed. The first supply of pilot air through the open solenoid valve 34 is directed by the shuttle valve 36 to the vent valve 7 to hold the latter closed.

Second stage of the operational sequence is to open the vent valve 7, close the vacuum valve 5, and maintain the counterblow valve 6 closed, in order to vent the blank mould cavity. This is achieved by de-energising the solenoid valve 34 which closes thereby interupting the first supply of pilot air to both the vacuum valve 5 and the vent valve 7. As a result, the vacuum valve 5 closes and the shuttle valve 36 floats, allowing the vent valve 7 to open under the action of the spring 19.

The third stage in the operational sequence of the assembly is to close the vent valve 7, open the counterblow valve 6, and maintain the vacuum valve 5 closed. This is achieved by energising and therefore opening the solenoid valve 35 which supplies the second supply of pilot air to the counterblow valve 6 so as to open the latter. Second supply of pilot air acts on the shuttle valve 36 which directs the second supply of pilot air to the vent valve 7 so as to close the latter. The vacuum valve 5 remains closed because the solenoid valve 34 remains de-energised. During this stage, the pressure of the counterblow air in the central chamber 32 assists in maintaining the valve members 8 and 10 against their respective seatings 12 and 18.

The fourth and final stage of the operational sequence of the assembly is to open the vent valve 7, close the counterblow valve 6 and maintain the vacuum valve 5 closed. This is achieved by de-energising the solenoid valve 35, to give the same set of conditions as those desdribed for the second stage of the operational sequence.

The four stages of the described operational sequence are tabulated below:

| Stage | Solenoid Valve 34 | Solenoid Valve 35 | Vacuum Valve 5 | Counterblow Valve 6 | Vent Valve 7 |
| --- | --- | --- | --- | --- | --- |
| 1st | Open | Closed | Open | Closed | Closed |
| 2nd | Closed | Closed | Closed | Closed | Open |
| 3rd | Closed | Open | Closed | Open | Closed |
| 4th | Closed | Closed | Closed | Closed | Open |

It will be appreciated that suction is applied to the blank mould through the central chamber 32 when the vacuum valve 5 is open, that counterblow air passes through the central chamber 32 when the counterblow valve 6 is open and that venting of the blank mould occurs through the central chamber 32 when the vent valve 7 is open. It will be seen that the central chamber 32 is bounded on three of its sides by the three valve seatings 12, 15, 18, and that the valve members 9 and 10 move in an aligned direction which is perpendicular to the direction of movement of the valve member 8. This compact construction provides a number of advantages. First the counterblow air passes over the stem of the valve member 8 of the vacuum valve 5 in order to cool the latter after the latter has been heated by having hot air from the blank mould drawn past it during the suction stage. Secondly, the counterblow air passes along a path which is less tortuous than in known arrangements using separate vacuum valve 5, counterblow valve 6 and vent valve 7. The described valve assembly also affords better venting of the blank mould and does not use elastomer materials which have given trouble in the past in known commercially available valves.

I claim:

1. A valve assembly for controlling the application of vacuum and counterblow air to a blank mould of a glassware forming machine, said assembly comprising first normally closed pilot open valve means for controlling the application of vacuum to the blank mould, second normally closed pilot open valve means for controlling the flow of counterblow air to the blank mould, and third normally open pilot closed valve means for venting the blank mould to atmosphere, said first, second and third valve means being enclosed within a single body, said body having a central chamber, first passage means for connection to a vacuum source, said first valve means connecting said first passage means with said chamber when open, second passage means for connection to a source of counterblow air, said second valve means connecting said second passage means with said chamber when open, third passage means leading to atmosphere, said third valve connecting said third passageway to said chamber when open, and shuttle valve means for directing a supply of pilot fluid pressure to the third valve to close the third valve means when the first valve is opened by said pilot fluid pressure and for directing a supply of pilot fluid pressure to the third valve to close the third valve means when the second valve is opened by said pilot fluid pressure.

2. The valve assembly according to claim 1 wherein said first valve means includes a valve member extending through said chamber so that in use counter blow air passes around the valve member to cool said valve member following the suction of hot air from the blow mould.

3. The valve assembly of claim 1 wherein said first and second valve means each include spring means for urging said first and second valve means into their closed position, and said third valve means includes spring means for urging it into its open position.

4. The valve assembly of claim 1 wherein the chamber is bounded on three sides by three valve seats for the first, second and third valve means respectively.

5. The valve assembly of claim 4 wherein said first valve means includes a first valve member extending through said chamber, and said second and third valve means includes respective second and third valve members movable in coaxial directions perpendicular to said first valve member.

* * * * *